United States Patent
Kurokawa et al.

(10) Patent No.: US 10,254,002 B2
(45) Date of Patent: Apr. 9, 2019

(54) COMMUNICATION SYSTEM, SIGNAL TRANSFER METHOD, AND AIR CONDITIONER

(71) Applicant: Mitsubishi Electric Corporation, Tokyo (JP)

(72) Inventors: Soichiro Kurokawa, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 238 days.

(21) Appl. No.: 15/506,012

(22) PCT Filed: Nov. 4, 2014

(86) PCT No.: PCT/JP2014/079250
§ 371 (c)(1),
(2) Date: Feb. 23, 2017

(87) PCT Pub. No.: WO2016/071962
PCT Pub. Date: May 12, 2016

(65) Prior Publication Data
US 2017/0277209 A1   Sep. 28, 2017

(51) Int. Cl.
*F24F 11/89* (2018.01)
*F24F 11/30* (2018.01)
(Continued)

(52) U.S. Cl.
CPC .............. *F24F 11/89* (2018.01); *F24F 11/30* (2018.01); *G05D 23/1905* (2013.01);
(Continued)

(58) Field of Classification Search
CPC ........ F24F 11/89; F24F 11/30; F24F 2110/10; F24F 11/0012; H04B 10/802; G05D 23/1905; G05D 23/1913
(Continued)

(56) References Cited

U.S. PATENT DOCUMENTS 7,336,738 B2 * 2/2008 Wakamatsu ........ H04L 27/2656
370/335
2004/0052319 A1   3/2004 Wakamatsu

FOREIGN PATENT DOCUMENTS

JP   58-073250 A   5/1983
JP   03-53055 U1   5/1991
(Continued)

OTHER PUBLICATIONS

Office Action dated Sep. 5, 2017 issued in corresponding JP patent application No. 2016-557376 (and English translation).
(Continued)

*Primary Examiner* — Ali Neyzari
(74) *Attorney, Agent, or Firm* — Posz Law Group, PLC

(57) ABSTRACT

An outdoor unit and an indoor unit communicate with each other. The outdoor unit includes a communication circuit that outputs a pulse signal to be transmitted to the indoor unit. The indoor unit includes a communication circuit that receives the pulse signal transmitted by the outdoor unit. An air conditioner 100 includes at least one photocoupler to transfer to the communication circuit the pulse signal output by the communication circuit. The communication circuit transmits a pulse signal with a first polarity and a pulse width corrected to be shorter by a predefined correction time than a predefined reference pulse width of the pulse signal.

11 Claims, 10 Drawing Sheets

(51) Int. Cl.
　　　*G05D 23/19*　　　(2006.01)
　　　*H04B 10/80*　　　(2013.01)
　　　*F24F 110/10*　　(2018.01)
(52) U.S. Cl.
　　　CPC ....... *G05D 23/1913* (2013.01); *H04B 10/802* (2013.01); *F24F 2110/10* (2018.01)
(58) Field of Classification Search
　　　USPC ...................................... 340/12.16
　　　See application file for complete search history.

(56) References Cited

FOREIGN PATENT DOCUMENTS

| | | |
|---|---|---|
| JP | 03-231527 A | 10/1991 |
| JP | 11-023045 A | 1/1999 |
| JP | H11-205245 A | 7/1999 |
| JP | 2003-069546 A | 3/2003 |
| JP | 2003-148789 A | 5/2003 |
| JP | 2003-298522 A | 10/2003 |
| JP | 2008-278518 A | 11/2008 |

OTHER PUBLICATIONS

International Search Report of the International Searching Authority dated Dec. 22, 2014 for the corresponding International application No. PCT/JP2014/079250 (and English translation).

* cited by examiner

PRIOR TO TRANSITION TO HIGH-SPEED COMMUNICATION MODE (1) TRAINING COMMAND TRANSMITTED BY OUTDOOR UNIT (2) TRAINING COMMAND RECEIVED BY INDOOR UNIT

FIG.7B
AFTER TRANSITION TO HIGH-SPEED COMMUNICATION MODE
(1) SIGNAL WAVEFORM TO BE TRANSMITTED ORIGINALLY BY OUTDOOR UNIT
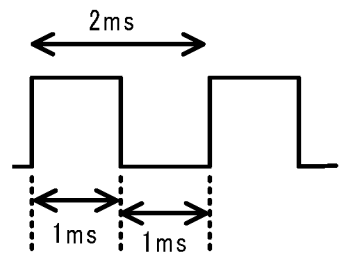
(2) CORRECTED SIGNAL WAVEFORM
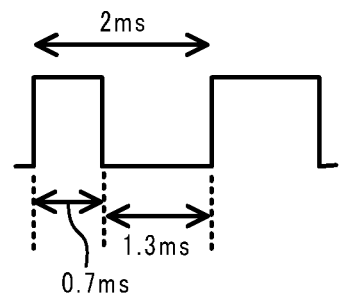
(3) SIGNAL WAVEFORM RECEIVED BY INDOOR UNIT
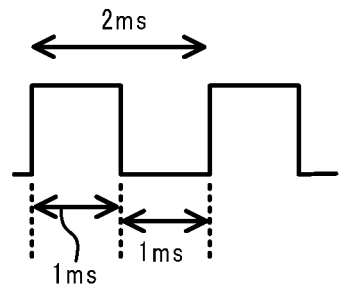

COMMUNICATION SYSTEM, SIGNAL TRANSFER METHOD, AND AIR CONDITIONER

CROSS REFERENCE TO RELATED APPLICATION

This application is a U.S. national stage application of International Patent Application No. PCT/JP2014/079250 filed on Nov. 4, 2014, the disclosure of which is incorporated herein by reference.

TECHNICAL FIELD

The present disclosure relates to a communication system, a signal transfer method, and an air conditioner.

BACKGROUND ART

Photocouplers are applied to communication circuits for transmission and reception of signals between an outdoor unit of an air conditioner and an indoor unit thereof. The photocouplers are used for electrical insulation between the outdoor unit and the indoor unit. Such a photocoupler includes a light emitting diode and a phototransistor, and is used for pulse signal transfer.

Phototransistors need a longer switching time from an ON state to an OFF state than a switching time from the OFF state to the ON state because of a mirror effect. For ease of understanding, the photocoupler is assumed in which an input of a high-level signal causes the light emitting diode to emit light and then the phototransistor to turn on, thereby resulting in an output of a high-level signal. When a pulse pair having a duty ratio of 50% is input to this photocoupler, a positive pulse width of the pulse pair to be output by this photocoupler increases, and a negative pulse width decreases accordingly. Thus the output pulse pair has a duty ratio that is greater than 50%. The use of the photocoupler thus causes a distortion of waveform of a transferred signal and also causes a change in the duty ratio thereof. The smaller pulse width increases the rate of change in the pulse width.

When the communication speed between the outdoor unit and the indoor unit is low, the output waveform of the photocoupler is not consistent with the input waveform, but this inconsistency does not interfere with transfer of information. However, the higher communication speed increases the distortion of the pulse to be transferred, eventually causing a transmission error. Hence, the communication speed is restricted.

In addition, the switching time of the phototransistor varies depending on the individual difference of the photocoupler at the time of manufacturing, a change in environmental condition like a surrounding temperature, aged deterioration, or the like. Thus photocouplers vary in response speed. Still further, uniform prediction and addressing of a change in pulse width originating from a photocoupler are difficult.

Yet still further, a communication line for transferring signals has a stray capacitance. This stray capacitance causes a delay in transferring signals, and causes a distortion of waveform thereof.

Moreover, when the communication line is set to be an open state (high impedance state), the voltage induced by the stray capacitance increases. The effect of this induced voltage restricts the speed-up of the communication.

Patent Literature 1 discloses a technique of controlling a communication line to be maintained in a constantly low impedance state in order to mitigate an adverse effect caused by the induced voltage.

CITATION LIST

Patent Literature

Patent Literature 1: Unexamined Japanese Patent Application Kokai Publication No. 2003-148789

SUMMARY OF INVENTION

Technical Problem

The structure disclosed in Patent Literature 1 is not capable of suppressing a distortion in signal waveform (a change in pulse width) originating from the responsivity of the photocoupler, and thus high-speed communication is difficult to achieve.

The present disclosure has been made under the foregoing circumstances, and an objective of the present disclosure is to enable high-speed communication between communication devices communicable with one another such as an outdoor unit of an air conditioner and an indoor unit thereof.

Solution to Problem

In order to achieve the above objective, the present disclosure provides a communication system for mutual communication between a first communication device and a second communication device. The first communication device includes a transmission circuit configured to output a pulse signal to be transmitted to the second communication device. The second communication device includes a reception circuit configured to receive the pulse signal transmitted by the first communication device. In addition, the communication system includes at least one photocoupler configured to transfer to the reception circuit the pulse signal output by the transmission circuit. The transmission circuit is configured to transmit the pulse signal with a first polarity and a pulse width corrected to be shorter by a predefined correction time than a predefined reference pulse width of the pulse signal.

Advantageous Effects of Invention

According to the present disclosure, transmitting a pulse signal having a corrected pulse width enables high-speed communication between communication devices communicable with each other such as an outdoor unit of an air conditioner and an indoor unit thereof.

BRIEF DESCRIPTION OF DRAWINGS

FIG. 7B is a diagram for explaining the correction of the signal waveform; and

DESCRIPTION OF EMBODIMENTS

An air conditioning system according to embodiments of the present disclosure is described below with reference to the drawings.

(First Embodiment)

Figure 1:
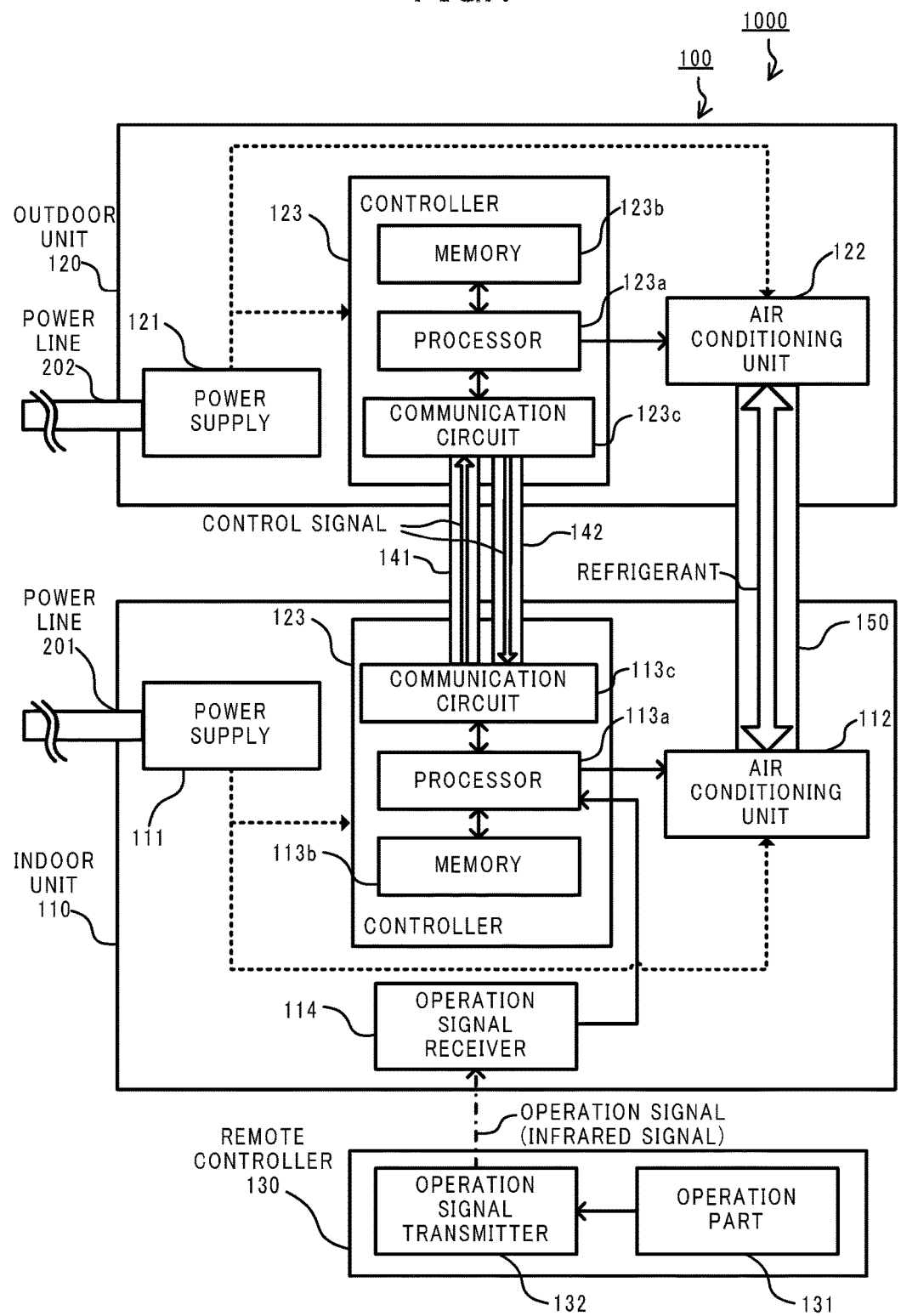
FIG. 1 is a diagram illustrating a structure of an air conditioning system according to a first embodiment of the present disclosure.

FIG. 1 illustrates a structure of an air conditioning system 1000 according to a first embodiment. The air conditioning system 1000 includes an air conditioner 100 that performs a cooling operation, a heating operation, and the like, to adjust the indoor air temperature and humidity. The air conditioner 100 includes an indoor unit 110 located outsides, an outdoor unit 120 located insides, and a remote controller 130 for a user to provide an operation-related instruction to the indoor unit 110.

The indoor unit 110 and the outdoor unit 120 are connected with each other via a pair of connection cables 141 and 142, and transmit and receive control signals to and from each other. The control signal contains information signals, such as an operation-related instruction (command) and various parameters. The control signal is a digital signal having a pulse-shape voltage waveform.

Power is supplied to a power supply 111 via a power line 201. The power supply 111 converts supplied the AC power into DC power, and supplies the DC power to each component of the indoor unit 110.

An air conditioning unit 112 of the indoor unit 110 includes an unillustrated heat exchanger (evaporator), a fan, and the like. The air conditioning unit 112 performs various operations in association with an air conditioning unit 122 of the outdoor unit 120 described below in order to adjust the air temperature and humidity of an indoor space where the indoor unit 110 is installed.

The air conditioning unit 112 is connected through refrigerant piping 150 to the air conditioning unit 122 of the outdoor unit 120 described below. Refrigerant flows through the refrigerant piping 150 applied to adjust the air temperature and humidity.

A controller 113 is a microprocessor, and includes, for example, a processor 113a for controlling each component of the indoor unit 110, a memory 113b for storing various programs and data, and a communication circuit 113c for communicating with the outdoor unit 120. The processor 113a executes the program stored in the memory 113b, and controls each component of the indoor unit 110. For example, when receiving an instruction to lower the air conditioning power from the user via the remote controller 130, the processor 113a decreases the blown air volume. In addition, the memory 113b stores parameters (definition information) for a pulse width for a pulse correcting process described below.

The communication circuit 113c is connected to a communication circuit 123c of the outdoor unit 120 described below via the pair of connection cables 141 and 142. The communication circuit 113c encodes a signal supplied by the processor 113a, and transmits a baseband signal to the communication circuit 123c of the outdoor unit 120. In addition, the communication circuit 113c receives a baseband signal from the communication circuit 123c, decodes the baseband signal, and outputs the decoded signal to the processor 113a.

In addition, the indoor unit 110 includes an operation signal receiver 114 for receiving an operation signal transmitted by the remote controller 130. The operation signal contains information indicating a user instruction to the air conditioner 100 regarding the operation thereof. The operation signal receiver 114 outputs the operation signal received from the remote controller 130 to the controller 113. When the operation signal is transmitted as an infrared signal, the operation signal receiver 114 includes an infrared signal receiver.

Next, a structure of the outdoor unit 120 is described. A power supply 121 of the outdoor unit 120 is connected to a power line 202, and power is supplied to the power supply 121 via the power line 202. The power supply 121 converts the supplied AC power via the power line 202 into DC power, and supplies the DC power to each component of the outdoor unit 120.

The air conditioning unit 122 of the outdoor unit 120 includes unillustrated compressor, heat exchanger (condenser), expansion valve, and the like, and performs various operations in association with the air conditioning unit 112 of the indoor unit 110 in order to adjust the air temperature and humidity of an indoor space where the indoor unit 110 is installed.

A controller 123 is a microprocessor, and includes, for example, a processor 123a for controlling each component of the outdoor unit 120, a memory 123b for storing various programs and data, and a communication circuit 123c for communicating with the indoor unit 110. The processor 123a executes the program stored in the memory 123b, and controls each component of the outdoor unit 120. In addition, the memory 123b stores parameters (definition information) for a pulse width for the pulse correcting process described below.

The communication circuit 123c is connected to the communication circuit 113c of the indoor unit 110 described below via the pair of connection cables 141 and 142. The communication circuit 123c encodes the signal supplied by the processor 123a, and transmits the baseband signal to the communication circuit 113c of the indoor unit 110. In addition, the communication circuit 123c receives the baseband signal from the communication circuit 113c, decodes the received baseband signal, and outputs the decoded signal to the processor 123a.

An operation part 131 of the remote controller 130 includes buttons, and outputs information indicating the user operation to an operation signal transmitter 132. The operation signal transmitter 132 outputs, based on the information supplied by the operation part 131, the operation signal to the operation signal receiver 114 of the indoor unit 110. An example operation signal output by the operation signal transmitter 132 is an infrared signal.

Figure 2:
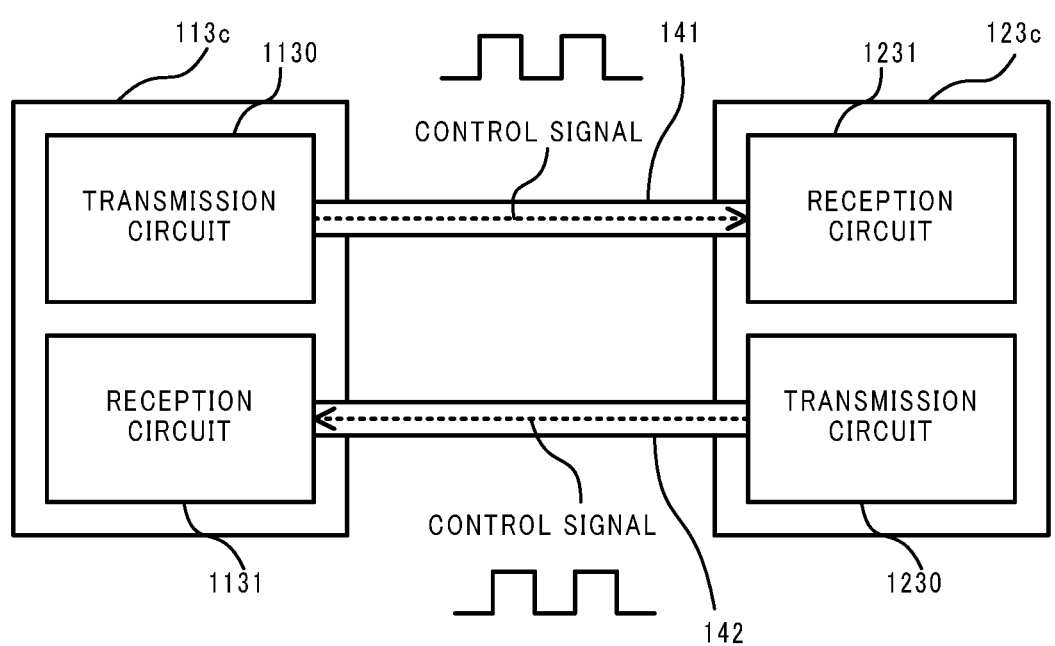
FIG. 2 is a diagram illustrating a schematic structure of a communication circuit for an indoor unit and for an outdoor unit.

Next, a communication channel between the indoor unit 110 and the outdoor unit 120 is described. As illustrated in FIG. 2, the communication circuit 113c of the indoor unit 110 and the communication circuit 123c of the outdoor unit 120 are connected with each other via the pair of connection cables 141 and 142.

The communication circuit 113c includes a transmission circuit 1130 and a reception circuit 1131. The communication circuit 123c includes a transmission circuit 1230 and a reception circuit 1231. The connection cable 141 has one end connected to the transmission circuit 1130 of the communication circuit 113c and another end connected to the reception circuit 1231 of the communication circuit 123c. The connection cable 142 has one end connected to the transmission circuit 1230 of the communication circuit 123c and another end connected to the reception circuit 1131 of the communication circuit 113c.

The connection cable 141 is a cable to transmit the control signal from the indoor unit 110 to the outdoor unit 120, while the connection cable 142 is a cable to transmit the control signal from the outdoor unit 120 to the indoor unit 110. The connection cables 141 and 142 are each a two-core cable having two signal lines.

The transmission circuit 1130 sets one signal line (ground line 141b) of the connected connection cable 141 to be at the ground potential, and changes the voltage applied to the other signal line (signal line 141a) thereof in order to transmit the pulse voltage waveform. Likewise, the transmission circuit 1230 sets one signal line (ground line 142b) of the connected connection cable 142 to be at the ground potential, and changes the voltage applied to the other signal line (signal line 142a) thereof in order to transmit the pulse voltage waveform. In addition, the reception circuit 1131 detects a potential difference between the two signal lines (signal line 142a and ground line 142b) forming the connected connection cable 142 in order to receive the pulse voltage waveform. Likewise, the reception circuit 1231 detects a potential difference between the two signal lines (signal line 141a and ground line 141b) forming the connected connection cable 141 in order to receive the pulse voltage waveform.

When the indoor unit 110 transmits the control signal to the outdoor unit 120, the processor 113a of the indoor unit 110 associates a binary value indicating the information to be transmitted (command, parameter, and the like) with the high level or low level of the pulse voltage waveform, and causes the transmission circuit 1130 to output the pulse voltage waveform. When the outdoor unit 120 receives the control signal from the indoor unit 110, the reception circuit 1231 receives the pulse voltage waveform based on the potential difference between the two signal lines of the connection cable 141, and outputs the received pulse voltage waveform to the processor 123a. Thus the processor 123a performs a determination on the control signal (command, parameter, and the like) represented by the pulse voltage waveform output by the reception circuit 1231.

Figure 3:
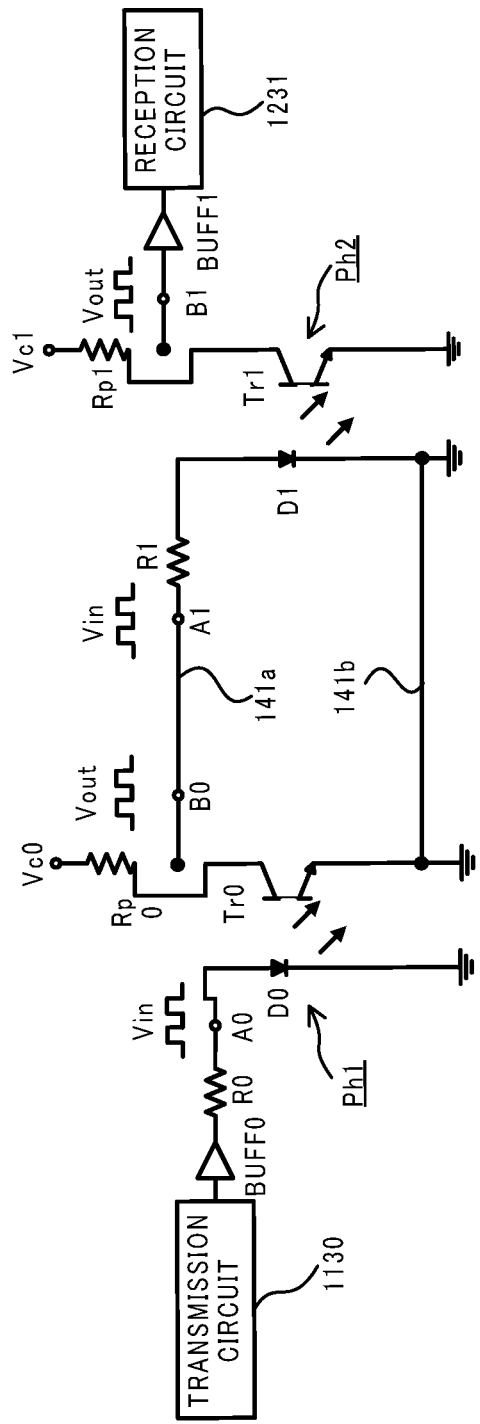
FIG. 3 is a diagram illustrating a circuit structure of a communication channel.

FIG. 3 illustrates a circuit structure of a communication channel between the indoor unit 110 and the outdoor unit 120. In order to electrically insulate the outdoor unit and the indoor unit from each other, photocouplers Ph1, Ph2 are provided at both ends of each of the connection cables 141 and 142. The following description is made assuming that when a signal input to the photocoupler is high-level, the photocoupler outputs a high-level signal.

The output terminal of the transmission circuit 1130 is connected to an input terminal A0 of the photocoupler Ph1 at the transmitting side via a buffer BUFF0 and a current limiting resistor R0. The pulse signal output by the transmission circuit 1130 is input to a light emitting diode D0, which is a light emitting element of the photocoupler Ph1, via the buffer BUFF0 and the current limiting resistor R0. When a voltage Vin applied to the anode of the light emitting diode D0 exceeds a threshold, a forward current flows through the light emitting diode D0, and thus light is emitted.

A reference voltage Vc0 is applied to the collector of a photo-transistor Tr0 via a pull-up resistor Rp0, and the emitter thereof is grounded. In addition, an output terminal B0 is connected to the collector of the photo-transistor Tr0. The output terminal B0 is connected to one end of the signal line 141a of the connection cable 141. The photo-transistor Tr0 turns on when receiving light emitted by the light emitting diode D0. The voltage value of the output terminal B0 changes upon switching of the on-off state of the photo-transistor Tr0. In this way, the photocoupler Ph1 transfers the output pulse signal of the transmission circuit 1130 to the signal line 141a.

The other end of the signal line 141a is connected to an input terminal A1 of the photocoupler Ph2. The transferred signal via the signal line 141a is input to a light emitting diode D1, which is a light emitting element of the photocoupler Ph2, via a current limiting resistor R1. When the voltage Vin applied to the anode of the light emitting diode D1 exceeds a threshold, a forward current flows through the light emitting diode D1, and thus light is emitted.

A reference voltage Vc1 is applied to the collector of a photo-transistor Tr1 via a pull-up resistor Rp1, and the emitter thereof is grounded. In addition, the collector of the photo-transistor Tr1 is connected to an output terminal B1. The output terminal B1 is connected to the input terminal of the reception circuit 1231 via a buffer BUFF11. The photo-transistor Tr1 turns on when receiving light emitted by the light emitting diode D1, and the voltage value of the output terminal B1 changes. In this way, the photocoupler Ph1 transfers the output pulse signal by the photocoupler Ph0 to the reception circuit 1231.

When the signal is transmitted by the indoor unit 110, and the outdoor unit 120 receives the signal, the signal is transferred in the circuit illustrated in FIG. 3 as follows. In the following explanation, the value "1" in the binary value is assigned to the high level for the pulse voltage waveform, and the value "0" is assigned to the low level therefor. Here, an example case in which the indoor unit 110 (processor 113a) outputs binary values "10" is described.

The processor 113a causes the transmission circuit 1130 to output the high-level voltage signal (positive pulses). This high-level voltage signal is input to the light emitting diode D0 via the buffer BUFF0 and the current limiting resistor R0. The forward voltage is thereby applied to the anode of the light emitting diode D0.

When the forward voltage applied to the anode of the light emitting diode D0 exceeds the threshold, the light emitting diode D0 is conductive and emits light. The photo-transistor Tr0 turns on when receiving light emitted by the light emitting diode D0. Thus the current flows from the collector of the photo-transistor Tr0 to the emitter thereof, and the collector voltage of the photo-transistor decreases. Then the low-level voltage signal is output from the output terminal B0. This voltage signal is input to the photocoupler Ph2 at the receiving side via the signal line 141a.

Thus the low-level voltage signal is input to the input terminal A1 of the photocoupler Ph2 at the receiving side, and the reverse forward voltage is applied to the anode of the light emitting diode D1. Accordingly, the light emitting diode D1 is not conductive, and the transistor Tr1 turns off since receiving no light. At this time, the collector voltage of the photo-transistor Tr1 is equal to the reference voltage Vc1, and the high-level voltage signal is output from the output terminal B1. This voltage signal is input to the reception circuit 1231 via the buffer BUFF1. The reception circuit 1231 applies appropriate processing to this voltage signal, and outputs the signal to the processor 123a. Since the voltage signal output by the reception circuit 1231 is the high-level voltage signal (positive pulses), the processor 123a determines that the received data is "1".

Subsequently, the processor 113a causes the transmission circuit 1130 to output the low-level voltage signal (negative pulses). This low-level voltage signal is input to the light emitting diode D0 via the buffer BUFF0 and the current limiting resistor R0. Thus the reverse voltage is applied to the anode of the light emitting diode D0. Accordingly, the light emitting diode D0 is not conductive, and the photo-transistor Tr0 turns off since receiving no light. At this time, the collector voltage of the photo-transistor Tr0 is equal to the reference voltage Vc0, and the high-level voltage signal is output from the output terminal B0. This voltage signal is output to the photocoupler Ph2 at the receiving side via the signal line 141a.

Hence, the high-level voltage signal is input to the input terminal A1 of the photocoupler Ph2 at the receiving side, and the forward voltage is applied to the anode of the light emitting diode D1. When the forward voltage applied to the anode of the light emitting diode D1 exceeds the threshold, the light emitting diode D1 emits light, and the photo-transistor Tr1 turns on. Hence, the current flows from the collector to the emitter, the collector voltage decreases, and the low-level voltage signal is output from the output terminal B1. This voltage signal is input to the reception circuit 1231 via the buffer BUFF1. The reception circuit 1231 applies appropriate processing to this voltage signal, and outputs the signal to the processor 123a. Since the output voltage signal by the reception circuit 1231 is the low-level voltage signal (negative pulses), the processor 123a determines that the received data is "0". Note that the photocouplers provided at the both ends of the connection cable 142, the transmission circuit 1230, and the reception circuit 1131 operate similarly as described above.

The photocouplers are provided at both the ends of the connection cables 141 and 142, and there is known a fact that the use of the photocouplers causes a distortion in waveform to be transferred. The higher communication speed increases the distortion in waveform, which may cause a transmission error. The distortion in waveform caused by the photocoupler, which is a cause of limiting the speed-up of communication, is described hereinafter.

Figure 4:
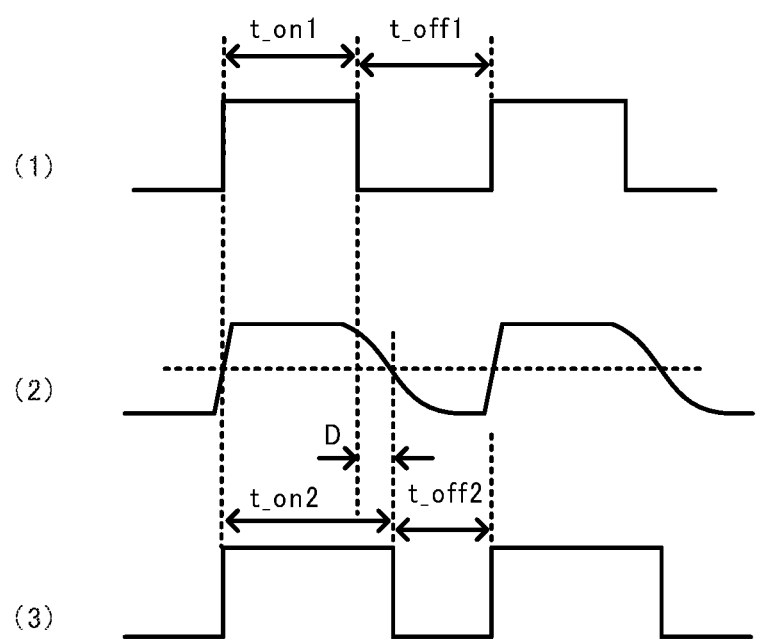
FIG. 4 is a diagram for explaining how the pulse waveform changes in accordance with the responsivity of a photocoupler.

FIG. 4 illustrates how the waveform transferred by the photocoupler causes a distortion. In FIG. 4, a chart (1) shows a waveform (transmission circuit output waveform) output by the transmission circuit 1130 (or transmission circuit 1230) as illustrated in FIG. 3. In FIG. 4, a chart (2) shows a waveform (photocoupler output waveform) output from the output terminal B1 of the photocoupler Ph2 at the receiving side as illustrated in FIG. 3.

As illustrated in the chart (1) of FIG. 4, a positive pulse duration (ON period) t_on1 and a negative pulse duration (OFF period) t_off1 of the transmission circuit output waveform are the same, and the ratio between the ON period and the OFF period is 1:1. This waveform is transferred by the photocouplers Ph1 and Ph2, and is output by the photocoupler Ph2. As illustrated in the chart (2) of FIG. 4, the photocoupler output waveform has pulses with gradually inclined falling edges. Hence, in the shaped waveform illustrated in a chart (3) of FIG. 4, the ON period t_on2 of the pulse becomes longer than the OFF period t_off2. In the example illustrated in the chart (3) of FIG. 4, an ON period t_on2 of the shaped waveform is the sum of the ON period t_on1 of the transmission circuit output waveform and a time D. As illustrated, the transmission circuit output waveform and the shaped waveform have the same time period of a cycle.

As described above, the ON period of the signal waveform having passed through the photocoupler becomes longer than that of the original pulse waveform. In view of this fact, a pulse waveform having a changed pulse width (in this example, a pulse waveform having a shorter ON period) may be supplied to the photocoupler based on a prediction that the pulse width of the pulse waveform increases after passing through the photocoupler. By correction of the pulse waveform to be supplied to the photocoupler, the pulse waveform having passed through the photocoupler can be substantially equal to the waveform that is to be originally transmitted.

The indoor unit 110 and the outdoor unit 120 are capable of transmitting and receiving the control signals at two preset communication speeds. The status in which the communication is made at a slow communication speed is defined as a normal communication mode, while the status in which the communication is made at a high communication speed is defined as a high-speed communication mode. In the normal communication mode, since the communication speed is slow, the adverse effect to the information transfer by the waveform distortion originating from the responsivity of the photocoupler is considerable to be small. Conversely, in the high-speed mode, since the communication speed is high, information indicated by the control signal is not properly transferred to the receiving device (indoor unit 110 or outdoor unit 120) because of the waveform originating from the responsivity of the photocoupler. Hence, prior to the transition to the high-speed communication mode, the indoor unit 110 and the outdoor unit 120 execute respective fast-speed communication mode setting processes described below as a preparation process for correcting the control signal. The indoor unit 110 and the outdoor unit 120 both perform the communication in the normal communication mode immediately after the activation, but transition to the high-speed communication mode at a predetermined timing.

Figure 5A:
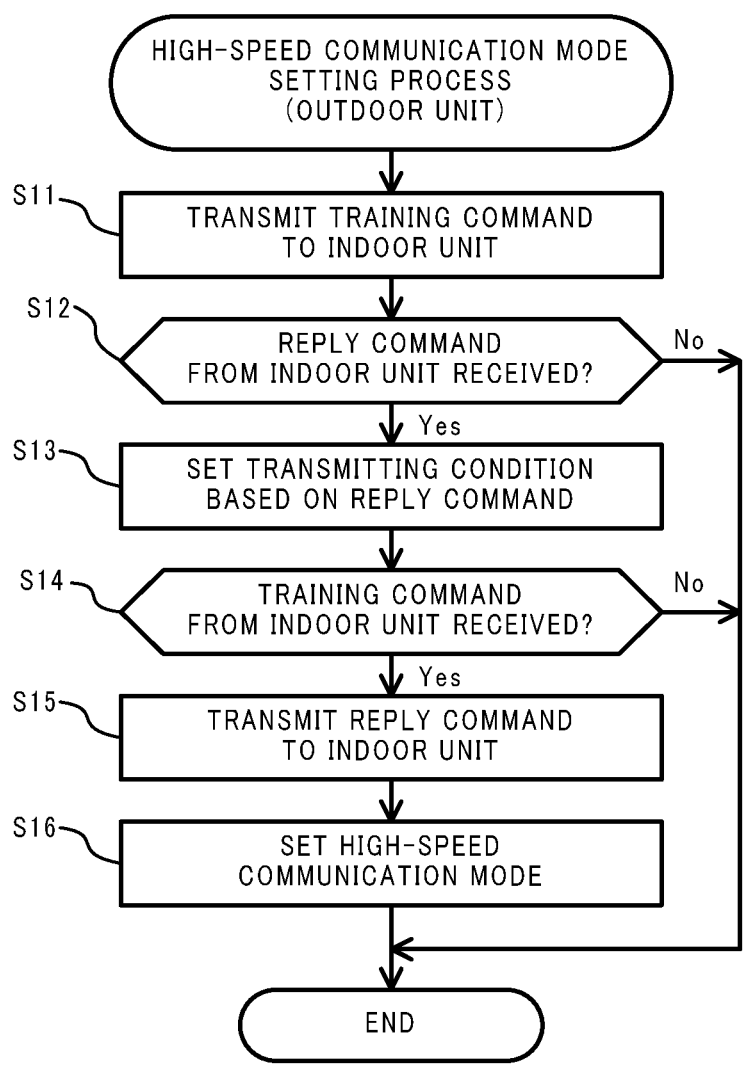
FIG. 5A is a flowchart illustrating a high-speed communication mode setting process executed by the outdoor unit.
Figure 5B:
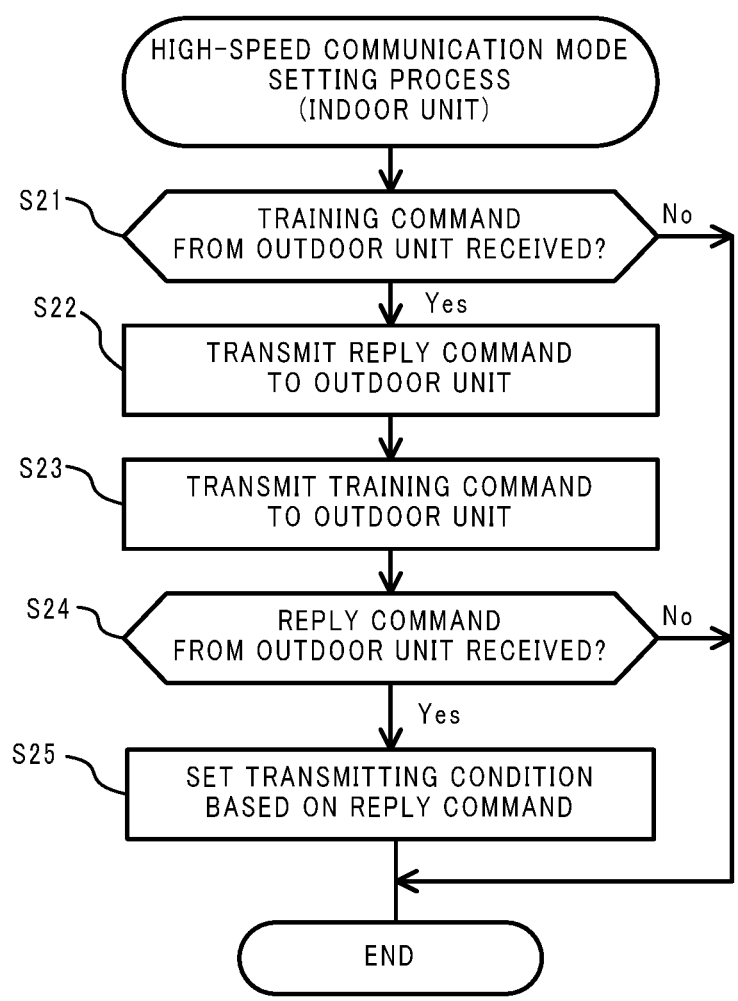
FIG. 5B is a flowchart illustrating a high-speed communication mode setting process executed by the indoor unit.

The indoor unit 110 and the outdoor unit 120 execute the following processes immediately after the activation. At this time, the indoor unit 110 and the outdoor unit 120 are capable of transmitting and receiving the control signals in the normal communication mode. FIG. 5A is a flowchart illustrating the high-speed communication mode setting process executed by the controller 113 of the indoor unit 110. FIG. 5B is a flowchart illustrating the high-speed communication mode setting process executed by the controller 123 of the outdoor unit 120.

Figure 6A:
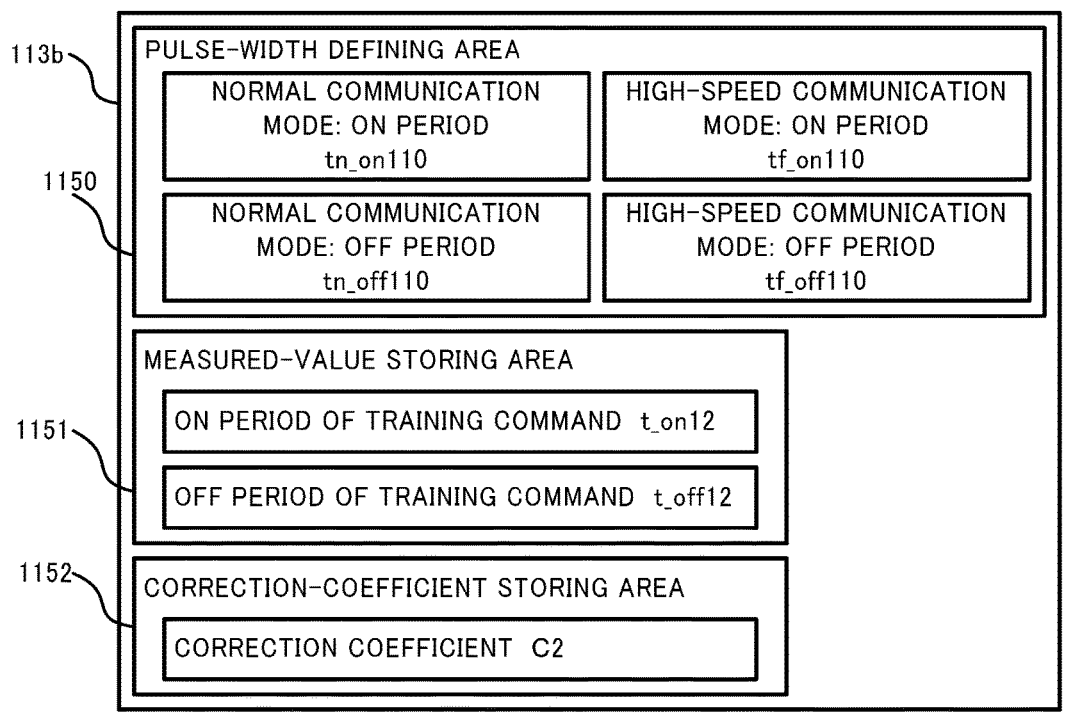
FIG. 6A is a diagram illustrating information stored in a memory of the indoor unit.
Figure 6B:
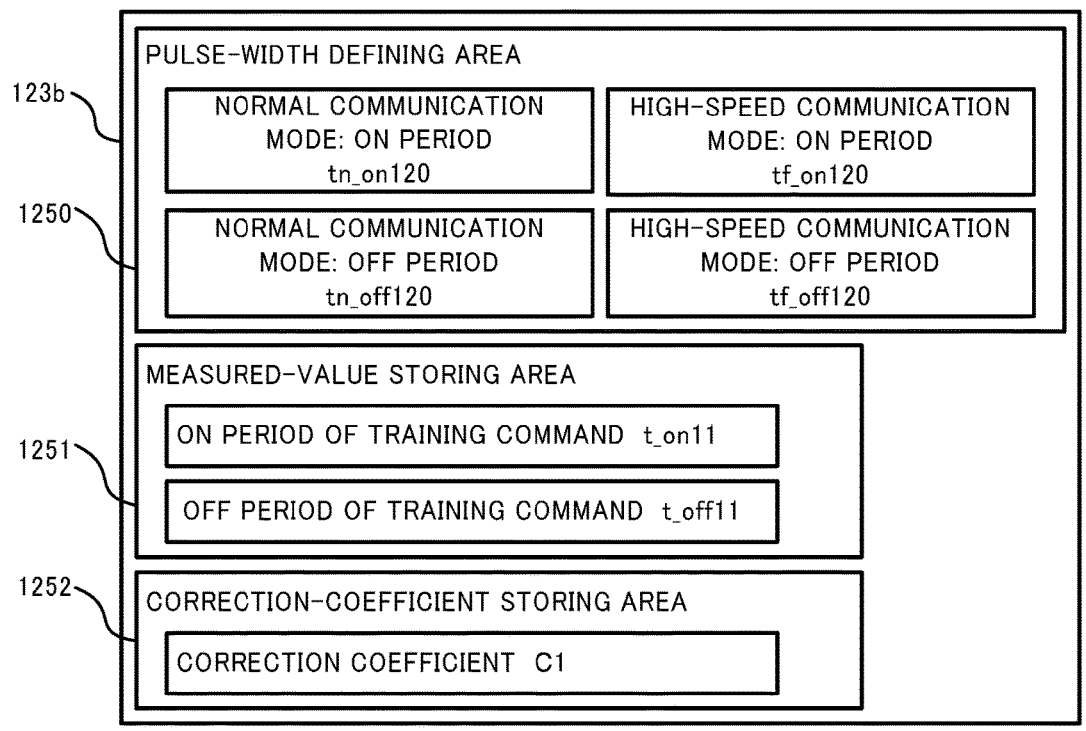
FIG. 6B is a diagram illustrating information stored in a memory of the outdoor unit.

In addition, the memory 113b of the indoor unit 110 and the memory 123b of the outdoor unit 120 pre-store definition information for the high-speed communication mode setting processes. As illustrated in FIG. 6A, a pulse-width defining area 1150 in the memory 113b of the indoor unit 110 stores an ON period tn_on110 and an OFF period tn_off110 both indicating the reference pulse width (default pulse width) of the pulse signal to be output by the transmission circuit 1130 in the normal communication mode. Still further, the pulse-width defining area 1150 also stores an ON period tf_on110 and OFF period tf_off110 both indicating the reference pulse width (default pulse width) of the pulse signal to be output by the transmission circuit 1130 in the high-speed communication mode. As illustrated in FIG. 6B, a pulse-width defining area 1250 in the memory 123b of the outdoor unit 120 stores an ON period tn_on120 and an OFF period tn_off120 both indicating the reference pulse width (default pulse width) of the pulse signal to be output by the transmission circuit 1230 in the normal communication mode. Still further, the pulse-width defining area 1250 also pre-stores an ON period tf_on120 and an OFF period tf_off120 both indicating the reference pulse width (default pulse width) of the pulse signal to be output by the transmission circuit 1230 in the high-speed communication mode. In any of the pulse signals, the desirable ratio between the ON period and the OFF period is 1:1. In this case, the pulse width (seconds) is defined to express the ON period and the OFF period.

Referring to FIG. 5A, first, the controller 123 of the outdoor unit 120 transmits a training command to the indoor unit 110 (Step S11). The pulse width of the pulses output by the transmission circuit 1230 in this case is the pulse width (seconds) defined by the ON period tn_on120 and tn_off120 in the normal mode stored in the pulse-width defining area 1250. The training command is one of the control signals transmitted from the outdoor unit 120 to the indoor unit 110, or vice versa. The training command is a test pulse signal (measurement signal) for measuring the pulse width at the time of receiving the control signal that is received by the indoor unit 110 or the outdoor unit 120.

The training command and a reply command described below are control signals that are unique to the high-speed communication mode setting process and that are transmitted from the indoor unit 110 or the outdoor unit 120, and are pulse voltage waveforms encoded as baseband signals. In the following description, the normal control signal other than the training command and the reply command is referred to as a normal command. The memory 113b of the indoor unit 110 pre-stores information (e.g., formats) of the training command and on the reply command to be received from the outdoor unit 120. The memory 123b of the outdoor unit 120 pre-stores information (e.g., formats) of the training command and on the reply command to be received by the indoor unit 110.

As illustrated in FIG. 5B, the controller 113 of the indoor unit 110 refers to the information of the training command stored in the memory 113b upon receiving the control signal from the outdoor unit 120, and determines whether the received control signal from the outdoor unit 120 is the training command (Step S21). When determining that the received control signal is the training command (YES in Step S21), the controller 113 measures the ON period t_on11 and the OFF period t_off11 both within a cycle of the received training command, and transmits to the outdoor unit 120 the reply command containing information of the measured values (ON period t_on11 and OFF period t_off11) (Step S22).

Conversely, when determining in Step S21 that the received control signal from the outdoor unit 120 is not the training command (NO in Step S21), the controller 113 ends the high-speed communication mode setting process. Subsequently, the controller 113 executes an appropriate process based on the received control signal (normal command).

After transmitting in Step S11 the training command, the controller 123 of the outdoor unit 120 waits for the reply command from the indoor unit 110 until a predetermined time elapses. When determining that the reply command from the indoor unit 110 is received (YES in Step S12), the controller 123 stores, in a measured-value storing area 1251 of the memory 123b illustrated in FIG. 6B, the ON period t_on11 and the OFF period t_off11 contained in the reply command, and sets the transmitting condition for the control signal based on the information on the ON period t_on11 and the OFF period t_off11 (Step S13).

More specifically, the controller 123 calculates the duty ratio (ON period t_on11/period of a cycle T11) within a cycle T11 that is a total of the ON period t_on11 and the OFF period t_off11. Referring to the pulse-width defining area 1250 in the memory 123b, the controller 123 also calculates the duty ratio (ON period tn_on120/period T01 of a cycle) within a cycle T01 that is a total of the ON period tn_on120 and the OFF period tn_off120 both for the signal to be transmitted from the transmission circuit 1230 to the indoor unit 110 in the normal mode.

Figure 7A:
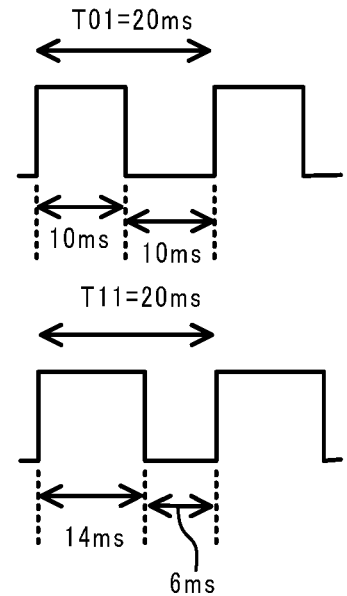
FIG. 7A is a diagram for explaining calculation of a correction coefficient used for correction of a signal waveform.

As illustrated in a chart (1) of FIG. 7A, when the ON period tn_on120 of the baseband signal output by the transmission circuit 1230 is 10 ms and the OFF period tn_off120 is 10 ms, the duty ratio D01 is 0.5 (10 ms/(10 ms+10 ms)). As illustrated in a chart (2) of FIG. 7A, when the ON period t_on11 of the training command received by the indoor unit 110 is 14 ms and the OFF period t_off11 is 6 ms, the duty ratio D11 is 0.7 (14 ms/(14 ms+6 ms)).

The controller 123 takes a calculation result of the duty ratio D01/the duty ratio D11 as a correction coefficient C1, and stores the correction coefficient C1 in a correction-coefficient storing area 1252 in the memory 123b illustrated in FIG. 6B. In this case, the correction coefficient C1 is 0.7.

After the mode transition to the high-speed communication mode, the controller 123 corrects the waveform of the control signal to be transmitted using the correction coefficient C1. The corrected ON period is obtainable by multiplying the pre-correction ON period by the correction coefficient C1. The corrected OFF period is obtainable by multiplying the pre-correction OFF period by (1−correction coefficient C1), and adding the result to the pre-correction OFF period. A chart (2) of FIG. 7 illustrates the pulse waveform corrected by the controller 123 in a case in which when, for example, an ON period tf_on120 and an OFF period tf_off120 in the high-speed communication mode, which are defined in the pulse-width defining area 1250, are 1 ms, as illustrated in a chart (1) of FIG. 7B. In this case, by the correction, the ON period becomes 0.7 ms (1 ms×0.7), and the corrected OFF period becomes 1.3 ms (1 ms×(1−0.7)+1 ms).

A chart (3) of FIG. 7B illustrates a waveform obtained when the indoor unit 110 receives the corrected control signal illustrated in the chart (2) of FIG. 7B. By passing through the photocoupler, as illustrated in the chart (3) of FIG. 7B, the ON period of the waveform of the signal received by the indoor unit 110 becomes longer than the ON period of the waveform at the time of transmission illustrated in the chart (2) of FIG. 7B. However, the waveform illustrated in the chart (3) of FIG. 7B is substantially the same as the signal waveform illustrated in the chart (1) of FIG. 7B. In other words, it can be said that the indoor unit 110 receives the signal waveform that is to be originally transmitted by the outdoor unit 120.

The flowchart of FIG. 5A is referred again. The controller 123 ends the high-speed communication mode setting process when not receiving the reply command from the indoor unit 110 (NO in Step S12) until the predetermined time elapses after transmission of the training command in Step S11.

On the other hand, as illustrated in FIG. 5B, the controller 113 of the indoor unit 110 transmits the training command to the outdoor unit 120 (Step S23) after transmitting the reply command to the outdoor unit 120 in Step S22. In this case, the pulse width of the pulses output by the transmission circuit 1130 is the pulse width (seconds) defined by the ON period tn_on110 and tn_off110 in the normal mode stored in the pulse-width defining area 1150. The controller 113 may transmit the training command to the outdoor unit 120 after waiting for a certain time after transmission of the reply command to the outdoor unit 120 in Step S22.

As illustrated in FIG. 5A, when receiving the control signal from the indoor unit 110, the controller 123 of the outdoor unit 120 refers to the information for the training command stored in the memory 123b, and determines whether the received control signal is the training command. When determining that the training command is received (YES in Step S14), the controller 123 measures, similarly to the indoor unit 110 described above, an ON period t_on12 and an OFF period t_off12 in a cycle of the training command, and transmits to the indoor unit 110 the reply command containing the information of the measured values (Step S15).

Conversely, when determining that the received control signal from the outdoor unit 120 is not the training command (NO in Step S14), the controller 123 ends the high-speed communication mode setting process. Subsequently, the controller 123 executes the process as appropriate based on the received control signal (normal command).

Referring to FIG. 5B, the controller 113 of the indoor unit 110 waits for the reply command from the outdoor unit 120 until the predetermined time elapses after transmitting the training command to the indoor unit 120 in Step S23. When determining that the reply command is received from the outdoor unit 120 (YES in Step S24), the controller 113 stores the ON period t_on12 and the OFF period t_off12, which are contained in the received reply command, in the measured-value storing area 1151 of the memory 113b, and sets the transmitting condition for the control signal based on the ON period t_on12 and the OFF period t_off12 (Step S25). More specifically, similarly to the outdoor unit 120 described above, the controller 113 calculates a correction coefficient C2 based on the ON period t_on12 and the OFF period t_off12 contained in the received reply command from the outdoor unit 120, and stores the calculated correction coefficient C2 in the correction-coefficient storing area 1152 in the memory 113b illustrated in FIG. 6A.

Conversely, when the controller 113 does not receive the reply command from the outdoor unit 120 (NO in Step S24) until the predetermined time elapses after transmission of the training command in Step S23, the controller 113 ends the high-speed communication mode setting process.

Referring to FIG. 5A, the controller 123 of the outdoor unit 120 sets the mode to the high-speed communication mode for the control signal transmission after the certain time has elapsed (Step S16) after transmission of the reply command to the indoor unit 110 in Step S15. In this case, the reason for the controller 123 to wait for the certain time after transmission of the reply command is because the time is taken into consideration for the controller 113 of the indoor unit 110 to execute the process relating to the transmitting condition setting in Step S25. The above describes the high-speed communication mode setting process executed cooperatively by the indoor unit 110 and the outdoor unit 120.

When those processes are completed, the indoor unit 110 and the outdoor unit 120 each transmits and receives the control signal in the high-speed communication mode. In this case, the indoor unit 110 and the outdoor unit 120 correct the waveforms of the control signals by applying the correction coefficients C1 and C2 stored in the memories 113b and 123b, respectively, and transmit the corrected control signals.

As described above, the indoor unit 110 and the outdoor unit 120 measure the pulse width (ON period and OFF period) of the pulse signal transmitted as the training command prior to the transition to the high-speed communication mode, and calculate a variation in pulse width based on the measured pulse width and the reference pulse width (the information on the pulse width of the pulse signal to be transmitted when there is no variation in pulse width) defined in the pulse-width defining areas 1150 and 1250. Next, based on the calculated variation, the pulse width of the control signal is corrected, and the corrected control signal is transmitted. Hence, the receiving device is capable of receiving the signal that has substantially the same waveform as that of the control signal to be originally transmitted. This enables a high-speed communication between the indoor unit 110 and the outdoor unit 120. In addition, a highly reliable communication is enabled.

In addition, when the indoor unit 110 and the outdoor unit 120 each execute the similar processes, the pulse signal is correctable in accordance with the level of distortion caused in the pulse signal in the communication channels in the respective directions from the indoor unit 110 to the outdoor unit 120, and vice versa. Furthermore, since the degree of distortion in the pulse signal is measured based on the pulse width of the pulse signal at the reception thereof, not only the photocoupler present on the communication channel but also other factors, such as a floating static capacitance between wirings originating from lengths, materials, and the like of the connection cables 141 and 142, can be comprehensively addressed.

The embodiment of the present disclosure has been described above, but the present disclosure is not limited to the embodiment.

The above describes an example case in which the high-speed communication mode setting process is executed after the indoor unit 110 and the outdoor unit 120 are activated, but the execution timing of the high-speed communication mode setting process is not limited to this example case. For example, while the indoor unit 110 and the outdoor unit 120 are turned on, such a process may be executed per a several-hour cycle. In this case, every time the high-speed communication mode setting process is executed, the correction coefficient C2 stored in the memory 113b (correction-coefficient storing area 1152) illustrated in FIG. 6A and the correction coefficient C1 stored in the memory 123b (correction-coefficient storing area 1252) illustrated in FIG. 6B are updated.

In the above description, the device that transmits the training command (outdoor unit 120 or indoor unit 110) calculates the duty ratio of the training command based on the reply command. Alternatively, the device that receives the training command (indoor unit 110 or outdoor unit 120) may be configured to measure the ON period of the received training command and the OFF period thereof, calculate the duty ratio based on the measured ON period and OFF period, and contain the calculated duty ratio in the reply command.

In the above description, after the mode transition to the high-speed communication mode, the device (outdoor unit 120 or indoor unit 110) that transmits the control signal transmits the corrected pulse signal. Alternatively, in the high-speed communication mode, the device that transmits the control signal may transmit the pulse signal that is not corrected, and the device that receives this pulse signal may correct the received pulse signal. The device that receives the training command prior to the transition to the high-speed communication mode calculates the correction coefficients C1 and C2 based on the duty ratio of the training command, and stores the correction coefficients C1 and C2. In addition, when receiving the pulse signal in the high-speed communication mode, such a device may correct the received pulse signal using the correction coefficients C1 and C2.

The above describes an example case in which the pulse width (ON period) of the positive pulse is corrected, but the polarity of the pulse to be corrected may be either polarity, and the similar effect is accomplishable when the pulse width (OFF period) of the negative pulse is corrected.

In the above description, the indoor unit 110 and the outdoor unit 120 calculate the correction coefficient based on the duty ratio of the training command, but a difference between the measured pulse width (ON period) of the training command and the reference pulse width (ON period) in the high-speed communication mode stored in the pulse-width defining areas 1150 and 1250 illustrated in FIGS. 6A, 6B may be taken as a correction amount, and in the high-speed communication mode, the indoor unit 110 and the outdoor unit 120 may transmit the pulse signal with a pulse width reduced by what corresponds to the correction amount from the pulse width (ON period) of the pulse signal to be transmitted. In this case, the device that has received the training command may measure the ON period of the received training command and the OFF period thereof, and may transmit the measured values to the device that has transmitted the training command. Alternatively, the device that has received the training command may pre-store the reference pulse width, measure the ON period of the received training command and the OFF period thereof, and transmit a difference between the measured value and the reference pulse width to the device that has transmitted to the training command.

When a single positive pulse is to be output, the positive pulse having a pulse width shorter than the reference pulse width by a correction time may be output, but when a sequence of N positive pulses (N is an integer equal to or greater than two) is output, the positive pulses having a pulse width shorter than the reference pulse width×N by the correction time may be output. The same applies to the case in which the pulse width of the negative pulse is corrected instead of the positive pulse.

In addition, instead of the simple subtraction of the difference (correction amount) between the measured pulse width of the training command and the reference pulse width from the pulse width of the pulse signal to be transmitted in the high-speed communication mode, a value obtained by multiplying the correction amount by a predetermined coefficient (0.7, 0.8, etc.) may be subtracted. This predetermined coefficient may be a value obtained by, for example, a statistical scheme based on the differences (correction amount) between the reference pulse width and the measured pulse widths of the training commands measured by the indoor units and the outdoor units.

In addition, the above describes an example case in which the pulse width (seconds) is defined as each parameter stored in the pulse-width defining area 1150 and in the pulse-width defining area 1250, but for example, parameters that are the cycle and the duty ratio may be stored in the pulse-width defining area 1150 and the pulse-width defining area 1250.

The timing at which the high-speed communication mode setting process is executed may be periodical, cyclical, or at random. In addition, in the above description, the high-speed communication mode setting process is executed prior to the transition to the high-speed communication mode, but this process may be executed after the transition to the high-speed communication mode. For example, the high-speed communication mode setting process may be executed prior to the transition to the high-speed communication mode, and the high-speed communication mode setting process may be executed per a several-hour cycle after the transition to the high-speed communication mode. This enables a proper correction of the control signal waveform when the responsivity of the photocoupler decreases due to a change in, for example, surrounding temperature.

Figure 8:
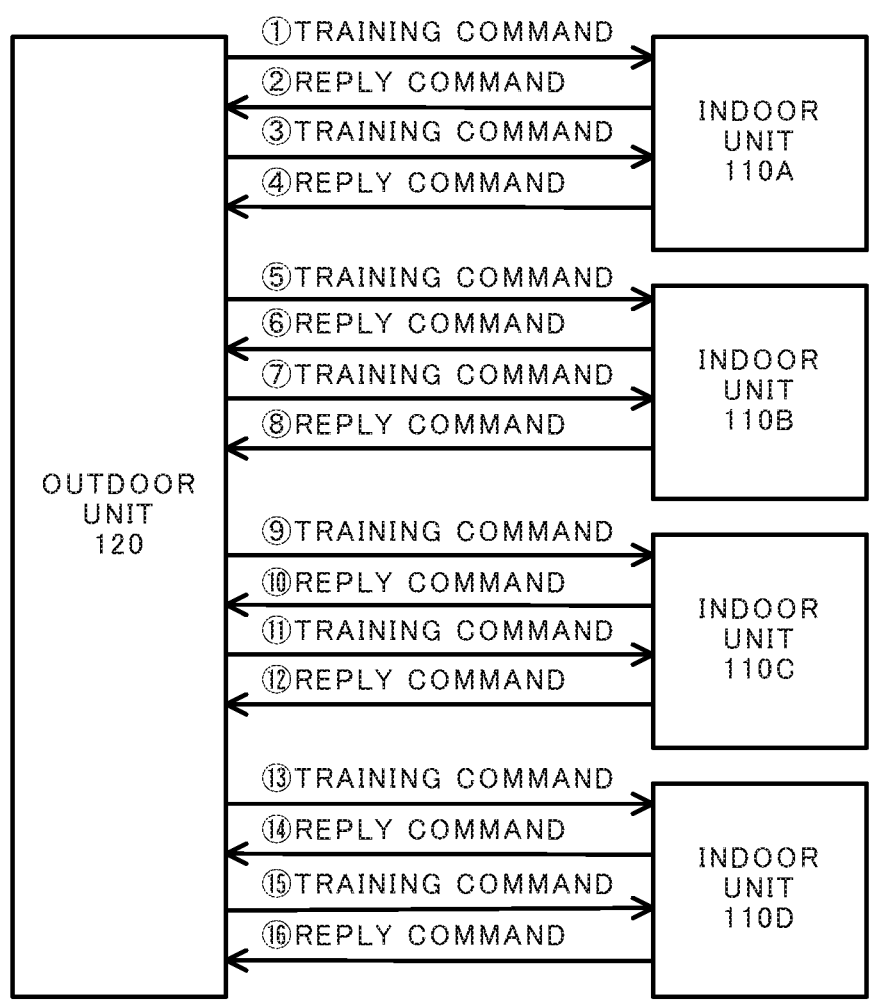
FIG. 8 is a diagram illustrating how the high-speed communication mode setting process is performed when there are multiple indoor units.

In addition, the process of correcting the control signal is also executable in a case in which multiple indoor units 110A to 110D are connected to the single outdoor unit 120 as illustrated in FIG. 8. For example, initially, the outdoor unit 120 transmits the training command to the indoor unit 110A, and sets the transmitting condition based on the received reply command from the indoor unit 110A. The indoor unit 110A transmits the training command to the outdoor unit 120 after transmitting the reply command to the outdoor unit 120, and sets the transmitting condition based on the reply command received from the outdoor unit 120. Subsequently, the similar processes are subsequently executed between the outdoor unit 120 and the indoor unit 110B, between the outdoor unit 120 and the indoor unit 110C, and between the outdoor unit 120 and the indoor unit 110D.

When determining that the high-speed communication setting process cannot be completed between the outdoor unit 120 and any of the indoor units 110A to 110D, and determining that a transition to the high-speed communication mode for a communication with such an indoor unit is not enabled, the outdoor unit 120 transmits and receives the control signal to and from such an indoor unit in the normal communication mode. For example, when no reply command is received from the indoor unit 110B within the predetermined time after transmitting the training command to the indoor unit 110B, the outdoor unit 120 does not set the high-speed communication mode for the indoor unit 110B. Thus the transmission and reception of the control signals between the outdoor unit 120 and the indoor unit 110B are performed in the normal communication mode. The transmission and reception of the control signals between the outdoor unit 120 and the indoor units 110A, 110C, and 110D, which have successfully transitioned to the high-speed communication mode, are performed in the high-speed communication mode.

When any of the indoor units 110A to 110D has no capability of transmission and reception of the control signal in the high-speed communication mode, the outdoor unit 120 does not receive a reply command from such an indoor unit even if having transmitted the training command to such an indoor unit, and thus the high-speed communication setting process is not completed. Hence, the outdoor unit 120 communicates with such an indoor unit in the normal communication mode, but communicates with the other indoor units in the high-speed communication mode.

In the above embodiment, the receiving device (indoor unit 110 or outdoor unit 120) that receives the training command measures the ON period and the OFF period within a cycle of the training command. Alternatively, the receiving device that receives the training command may measure the ON periods and the OFF periods within multiple cycles (for example, three cycles), and may contain, in the reply command, the ON periods and the OFF periods of the multiple cycles. Alternatively, the receiving device that receives the training command may contain, in the reply command, the average value of the ON periods of the multiple cycles and that of the OFF periods thereof. Alternatively, the receiving device the receives the training command may measure the ON periods and the OFF periods of multiple cycles (for example, three cycles), and may contain, in the reply command, the ON period and the OFF period of the cycle having the largest difference between the ON period and the OFF period (a change amount of duty ratio than the duty ratio at the time of transmission).

The above embodiment describes an example case in which the transmitter photocoupler Ph1 and the receiver photocoupler are disposed at both the ends of the connection cable 141. However, the placement of the photocoupler within the communication channel as described in the above examples is not always necessary. The photocoupler may be disposed at the transmitting-side communication channel only, or may be disposed at the receiving-side communication channel only. Alternatively, the photocoupler may be provided in between in the communication channel.

The above embodiment describes an example case in which the binary value "1" is assigned to the high level of the pulse voltage waveform, while the binary value "0" is assigned to the low level. However, the above signal transfer method is also applicable to the communication in a signal system in which the binary value "0" is assigned to the high level of the pulse voltage waveform, and the binary value "1" is assigned to the low level.

The above example describes an example case in which the photocouplers Ph1 and Ph2 are disposed at the communication channel, but photoelectric conversion elements (for example, photo-diodes) other than the photocoupler may be applied. Although the NPN type photo-transistors Tr0 and Tr1 are used as the light emitting diodes included in the photocouplers Ph1 and Ph2 in the example illustrated in FIG. 3, PNP type light emitting diodes may be used.

Still further, in the circuit illustrated in FIG. 3, the collector voltages that are respective outputs of the phototransistors Tr0 and Tr1 are output from the output terminals B0 and B1. Alternatively, the emitter voltages that are respective outputs of the photo-transistors Tr0, Tr1 may be output. In this case, a resistance is provided between the emitter and the ground, and the output terminals B0 and B1 are each provided between the emitter and the resistor.

The above example describes an example case in which the positive pulse period of the pulse waveform transmitted and received between the indoor unit 110 and the outdoor unit 120 is the same as the negative pulse period thereof (the duty ratio is 50%), but for example, the positive pulse may be longer than the negative pulse, or the negative pulse may be longer than the positive pulse. In any case, the signal transmitting device (indoor unit 110, outdoor unit 120) and the signal receiving device (indoor unit 110, outdoor unit 120) may pre-store the defined pulse width, and may correct the signal pulse width to be transmitted based on the defined pulse width and the measured value in accordance with the training command.

In addition, the indoor unit 110 and the outdoor unit 120 may transmit, to other devices connected via a network (for example, a computer), information on the amount of variation in calculated duty ratio, the correction coefficient, and the like. A record of variation in duty ratio may be accumulated, and statistical data on the multiple air conditioners may be created based on the accumulated record information.

The above embodiment describes a method for correcting the signal waveform and transferring the corrected signal with reference to an example of the air conditioning system for the air conditioner including the indoor unit and the outdoor unit that communicate with each other. This method is also applicable to other systems in which two or more communication devices communicate with one another. When a photocoupler (or other elements having the similar responsivity to the photocoupler) is placed between the two or more devices in the communication channel, the use of this signal transfer method enables the consistency between the transmitted signal waveform and the received signal waveform to be kept.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to fields of, for example, implementing high-speed communication between the outdoor unit of an air conditioner and the indoor unit thereof.

REFERENCE SIGNS LIST

100 Air conditioner
110 Indoor unit
111, 121 Power supply
112, 122 Air conditioning unit
113, 123 Controller
113a, 123a Processor
113b, 123b Memory
113c, 123c Communication circuit
1130, 1230 Transmission circuit
1131, 1231 Reception circuit
114 Operation signal receiver
120 Outdoor unit
130 Remote controller
131 Operation part
132 Operation signal transmitter
141, 141 Connection cable
141a, 142a Signal line
141b, 142B Ground line
150 Refrigerant piping
201, 202 Power line
1000 Air conditioning system

The invention claimed is:
1. A communication system, comprising:
a first communication device and a second communication device that are configured to communicate with each other;
at least one photocoupler; and
a transferrer,
wherein
the first communication device comprises a transmission circuit configured to output a pulse signal to be transmitted to the second communication device,
the second communication device comprises a reception circuit configured to receive the pulse signal transmitted by the first communication device, the at least one photocoupler is configured to transfer to the reception circuit the pulse signal output by the transmission circuit, the transmission circuit is configured to transmit a test pulse signal with a first polarity and with a first pulse width, the reception circuit is configured to receive the test pulse signal, the transferrer is configured to transfer to the transmission circuit a difference between the first pulse width and a pulse width of the test pulse signal received by the reception circuit, and the transmission circuit is configured to obtain a correction time based on the difference transferred by the transferrer, and transmit the pulse signal with the first polarity and with a pulse width corrected to be shorter by the correction time than a predefined reference pulse width.

2. The communication system according to claim 1, wherein the transmission circuit is configured to set the correction time to be equal to the difference transferred by the transferrer.

3. The communication system according to claim 1, wherein the transmission circuit is configured to transmit the test pulse signal cyclically, periodically, or at random.

4. The communication system according to claim 1, wherein the transmission circuit comprises:

a storage configured to store a parameter defining a default pulse width of the pulse signal to be transmitted when there is no variation in the pulse width of the pulse signal; and an outputter configured to output the pulse signal with the first polarity and with a pulse width that is shorter by the correction time than the default pulse width defined by the parameter stored in the storage.

5. The communication system according to claim 1, wherein the transmission circuit is configured to output the pulse signal with the pulse width that is shorter by the correction time than the reference pulse width when the single pulse signal with the first polarity is output, and the transmission circuit is configured to output the pulse signal with a pulse width that is shorter by the correction time than the reference pulse width×N when a sequence of the N pulse signals with the first polarity is output, wherein N is an integer equal to or greater than two.

6. The communication system according to claim 1, wherein the transmission circuit is configured not to correct a pulse width of the pulse signal with a second polarity opposite to the first polarity.

7. The communication system according to claim 1, wherein the transmission circuit is configured not to correct the pulse width of the pulse signal in communication at a first communication speed, and the transmission circuit is configured to correct the pulse width of the pulse signal with the first polarity in communication at a second communication speed higher than the first communication speed.

8. The communication system according to claim 1, wherein the at least one photocoupler comprises:

a light emitting element configured to emit light with the pulse signal that has the first polarity and is output by the transmission circuit; and a switching element configured to be turned on with the light emitted by the light emitting element, the correction time is equivalent to a difference between a switching time taken for the switching element to switch from an OFF state to an ON state and a switching time taken for the switching element to switch from the ON state to the OFF state.

9. The communication system according to claim 1, wherein each of the first communication device and the second communication device comprises the transmission circuit and the reception circuit, the transmission circuit of the first communication device is configured to transfer the pulse signal to the reception circuit of the second communication device via a plurality of the photocouplers, and the transmission circuit of the second communication device is configured to transfer the pulse signal to the reception circuit of the first communication device via the plurality of the photocouplers.

10. A signal transfer method for transferring a signal between a first communication device and a second communication device, the signal transfer method comprising:

a pulse signal outputting step of outputting, from either one device of the first communication device and the second communication device, a pulsed electrical signal;

an electric-photo conversion step of performing electric-photo conversion on the pulsed electrical signal output in the pulse signal outputting step, and of emitting light;

a photoelectric conversion step of performing, by a photoelectric conversion element, photoelectric conversion on the light emitted by the electric-photo conversion, and of outputting a pulsed electrical signal;

a receiving step of receiving, by another device of the first communication device and the second communication device, the pulsed electrical signal output by the photoelectric conversion; and a correction time obtaining step of outputting a pulsed electrical test signal from the one device of the first communication device and the second communication device, obtaining a difference between a predefined pulse width and a pulse width of the pulsed electrical test signal received by the other device of the first communication device and the second communication device, and obtaining a correction time based on the obtained difference, wherein a pulse width of the pulsed electrical signal output in the pulse signal outputting step is set to be shorter by the correction time obtained in the correction time obtaining step than a reference time defined by a communication speed.

11. An air conditioner comprising:

an outdoor unit;

an indoor unit;

at least one photocoupler; and a transferrer, wherein either one unit of the outdoor unit and the indoor unit comprises a transmission circuit configured to transmit a pulse signal to another unit of the outdoor unit and the indoor unit, the other unit of the outdoor unit and the indoor unit comprises a reception circuit configured to receive the pulse signal transmitted by the one unit of the outdoor unit and the indoor unit, the at least one photocoupler is configured to transfer to the reception circuit the pulse signal output by the transmission circuit, the transmission circuit is configured to transmit a test pulse signal with a first polarity and with a first pulse width, the reception circuit is configured to receive the test pulse signal, the transferrer is configured to transfer to the transmission circuit a difference between the first pulse width and a pulse width of the test pulse signal received by the reception circuit, and the transmission circuit is configured to obtain a correction time based on the difference transferred by the transferrer, and transmit the pulse signal with the first polarity and with a pulse width corrected to be shorter by the correction time than a predefined reference pulse width.

* * * * *